(12) United States Patent
Hubert et al.

(10) Patent No.: US 7,945,296 B2
(45) Date of Patent: May 17, 2011

(54) MODULE FOR EXCHANGING INFORMATION BY CARRIER-CURRENTS COMPRISING ACTIVATED AND DEACTIVATED STATES

(75) Inventors: Vincent Hubert, Pontoise (FR); Francis Bories, Vaureal (FR)

(73) Assignee: Valeo Electronique et Systems de Liaison, Montigny-le-Bretonneux (FR)

( * ) Notice: Subject to any disclaimer, the term of this patent is extended or adjusted under 35 U.S.C. 154(b) by 963 days.

(21) Appl. No.: 11/629,793

(22) PCT Filed: Jun. 14, 2005

(86) PCT No.: PCT/FR2005/001476
§ 371 (c)(1),
(2), (4) Date: Feb. 5, 2007

(87) PCT Pub. No.: WO2006/008363
PCT Pub. Date: Jan. 26, 2006

(65) Prior Publication Data
US 2008/0090544 A1    Apr. 17, 2008

(30) Foreign Application Priority Data
Jun. 18, 2004   (FR) ..................... 04 06662

(51) Int. Cl.
*H04B 1/16* (2006.01)
(52) U.S. Cl. ............... 455/574; 455/132; 455/575.9
(58) Field of Classification Search ............... 455/334, 455/343.1, 343.2, 343.5, 344, 574, 67.11, 455/132, 575.9; 340/825.17, 825.06
See application file for complete search history.

(56) References Cited

U.S. PATENT DOCUMENTS
5,089,974 A    2/1992 Demeyer et al.
5,539,388 A *  7/1996 Modgil ..................... 340/3.2
6,760,578 B2 * 7/2004 Rotzoll .................. 455/343.2

FOREIGN PATENT DOCUMENTS
WO    WO 94/18803 A1    8/1994
WO    WO 99/36802 A1    7/1999
* cited by examiner

*Primary Examiner* — Blane J Jackson
(74) *Attorney, Agent, or Firm* — Oliff & Berridge, PLC

(57) ABSTRACT

The module for exchanging information by carrier-currents (22, 24) for controlling an electrical member (12, 14) includes first receiver means (34A, 36A) for receiving an information-conveying signal. The first receiver means (34A, 36A) may take on two states, respectively an activated state and a deactivated state. The module (22, 24) further includes second receiver means (34B, 36B) for receiving a wakeup signal for activating the first receiver means (34A, 36A) to switch from the deactivated state to the activated state.

16 Claims, 2 Drawing Sheets

MODULE FOR EXCHANGING INFORMATION BY CARRIER-CURRENTS COMPRISING ACTIVATED AND DEACTIVATED STATES

The present invention relates to a module for exchanging information by carrier-currents and to a method of managing the operation of said module.

The invention applies in particular to controlling an electrical member in a motor vehicle.

A motor vehicle usually includes numerous electrical members powered by a battery.

It is known to control these members by means of a module for exchanging information by carrier-currents.

Thus, there is already known in the state of the art, a module for exchanging information by carrier-currents for controlling an electrical member, the module being of the type comprising first receiver means for receiving an information-conveying signal, said first receiver means being capable of taking two states, respectively an activated state and a deactivated state.

A module of that type used in a motor vehicle superposes on the direct current (DC) voltage signal delivered by the battery, high frequency signals conveying information. The information-conveying high-frequency signals thus travel over the electric circuit (also referred to as an electricity line) for powering the electrical members.

It should be observed that in general the first receiver means include means responsive to signals in a relatively narrow frequency band and consume a relatively large amount of power.

However, it is desirable to be able to limit the power consumption of an information-exchange module of the above-specified type as much as possible, in particular by reducing this consumption as much as possible when the module is not operational.

An object of the invention is to provide a module of the above-specified type presenting power consumption that is relatively limited when the module is not operational.

To this end, the invention provides a module for exchanging information by carrier-currents of the above-specified type, characterized in that it further comprises second receiver means for receiving a wakeup signal for activating the first receiver means to cause them to pass from their deactivated state to their activated state.

Since the second means are dedicated essentially solely to waking up the first receiver means, they can be relatively simple and consume less energy than the first receiver means. Thus, when the module is not operational, the first receiver means can be deactivated, with the consumption of the module then being limited to the consumption of the second receiver means.

A module of the invention may also include one or more of the following characteristics:

- the first receiver means are responsive to signals at frequencies lying in a first frequency band, and the second receiver means are responsive to signals at frequencies lying in a second frequency band that is broader than the first frequency band;
- the first receiver means are responsive to signals at frequencies lying in a first frequency band, and the second receiver means are responsive to signas lying in a second frequency band that is disjoint from the first frequency band;
- the first receiver means include means forming a narrow bandpass filter and the second receiver means include means forming a broad bandpass filter functionally arranged upstream from the means forming a narrow bandpass filter in the propagation direction of a signal received by the module;
- the module contains inhibit means for inhibiting signals received by the second receiver means, e.g. comprising means forming a filter or timer means; and
- the carrier currents travel in an electric circuit connecting an electric power-supply battery to an electrical member of a motor vehicle.

The invention also provides a method of managing the operation of a module as defined above, characterized in that the module is selectively put into a sleep state or into an operational state by respectively deactivating or activating the first receiver means, the second receiver means being active in both the sleep state and in the operational state.

A method of the invention may also include one or more of the following characteristics:

- with the first receiver means being designed to receive management signals and with the module being initially in an operational state, the module is switched to a sleep state after it ceases to receive management signals;
- the module is switched to the sleep state after a predetermined time lapse following reception of a management signal requesting the module to go to sleep;
- the time lapse terminates after the management signals have ceased to be received;
- the management signals are formed using a modulated carrier wave, management signals ceasing to be received corresponding to the carrier wave ceasing to be received;
- the time lapse begins after the management signals cease to be received;
- when the first receiving means receive the management signal requesting the module to go to sleep, the module is authorized to transmit only in response to management signals; and the management signals cease to be received after the module has acknowledged proper reception of the management signal requesting it to go to sleep, in response to a management signal requesting an acknowledgment;
- the time lapse begins before the management signals cease to be received;
- for the module being initially in a sleep state, when the second receiver means receive a wakeup signal, the first receiver means are activated in order to put the module in an operational state; the signal received by the module is observed over a predetermined observation time to determine whether it is meaningful; and the module is returned to a sleep state if, at the end of the observation time, it is concluded that the signal received by the module is not meaningful;
- when the module is in a sleep state, signals received by the second receiver means are inhibited for a predetermined inhibit time; and
- the module initially being in a sleep state, on the second receiver means receiving a wakeup signal of duration longer than the inhibit time, the first receiver means are activated in order to put the module in an operational state.

The invention also provides a method of managing the operation of at least two modules, each as defined above, the operation of each module being managed by a method as defined above, and the method being characterized in that the inhibit times of the modules are different.

The invention can be better understood on reading the following description given purely by way of example and made with reference to the drawings, in which:

FIG. 1 shows a network 10 including at least one module for exchanging information by carrier-currents constituting a first embodiment of the invention.

In the example shown, the modules are for controlling electrical members 12, 14 of a motor vehicle, which members are powered by a battery 16.

In the network 10, the modules are coupled in conventional manner to an electric circuit 18 connecting the members 12, 14 to the battery 16 to enable information to be exchanged between the modules using carrier currents traveling over the circuit 18.

Figure 1:
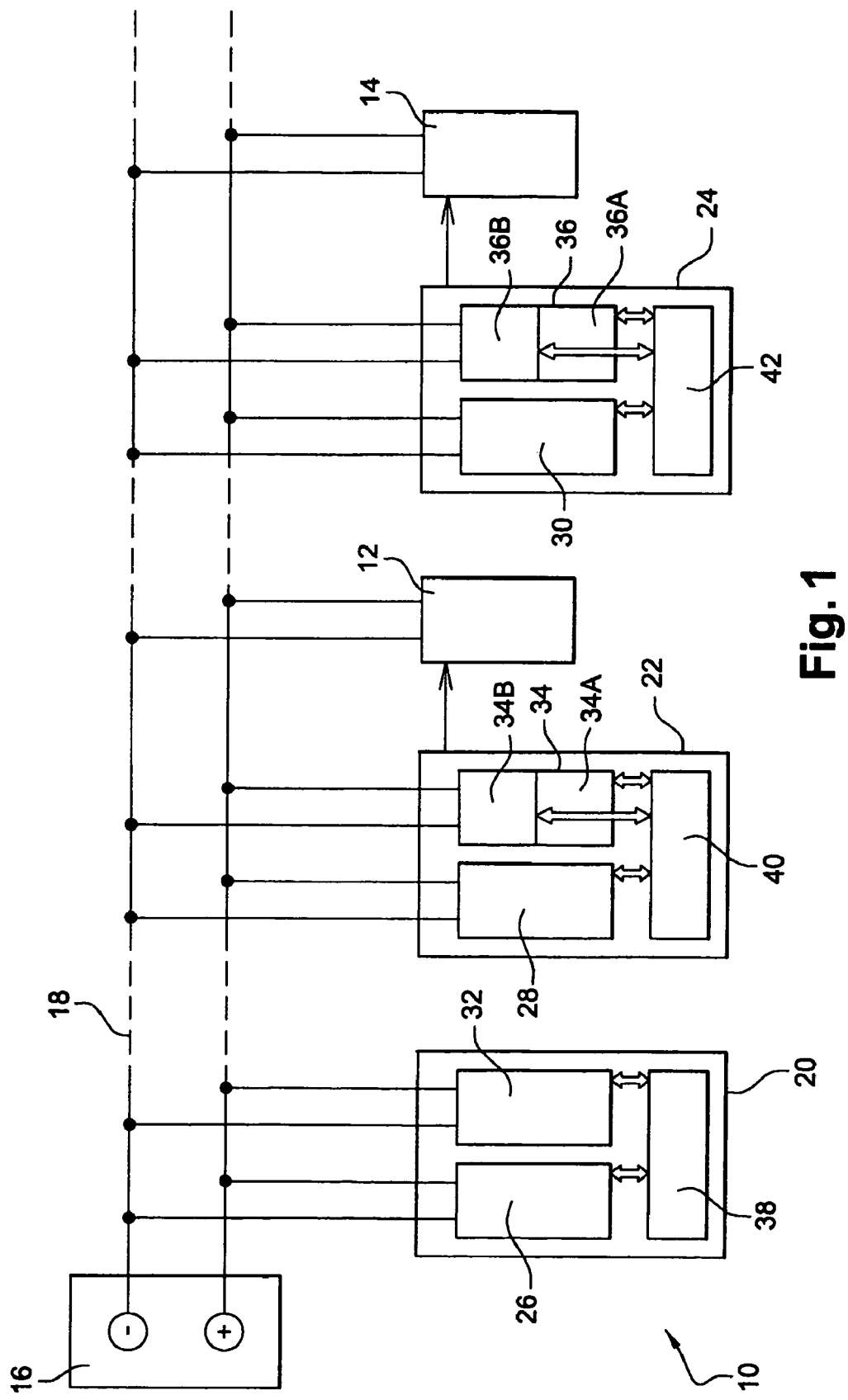
FIG. 1 is a diagrammatic view of a network of information-exchange modules including at least one module constituting a first embodiment of the invention.

In FIG. 1, there is shown a master module 20 suitable for exchanging information with at least two slave modules 22, 24 in a first embodiment of the invention. These slave modules 22 and 24 are dedicated to controlling the members 12 and 14 respectively.

Each module 20 to 24 includes transmitter means 26, 28, 30, receiver means 32, 34, 36, and a microcontroller 38, 40, 42 for managing information exchange.

The transmitter and receiver means of each module are connected to their respective microcontrollers in conventional manner.

The receiver means 34, 36 of each slave module 22, 24 comprise two stages each, respectively 34A, 34B and 36A, 36B. Each first stage 34A, 36A forms first means for receiving information-conveying signals. Each first stage 34A, 36A is functionally disposed downstream from a second stage 34B, 36B forming second means for receiving information-conveying signals.

Each second stage 34B, 36B of the receiver means of a slave module 22, 24 is connected to its respective microcontroller 40, 42.

Each first stage 34A, 36A is suitable for taking two states, respectively an activated state and a deactivated state.

The master module 20 is suitable for putting each slave module 22, 24 selectively in a sleep state and in an operational state, sending for the attention of each slave module 22, 24 signals for managing its operation.

When a slave module 22, 24 is in a sleep state, the first stage 34A, 36A of its receiver means is deactivated.

When a slave module 22, 24 is in an operational state, the first stage 34A, 36A is activated.

The second stage 34B, 36B of the receiver means of a slave module 22, 24 is active both in the sleep state and in the operational state of the module.

In order to cause the slave module to switch from its sleep state to its operational state, the second stage 34B, 36B of the receiver means of a slave module 22, 24 serves to activate the first stage 34A, 36A of the receiver means 34, 36, causing said means to switch from the deactivated state to the activated state.

Preferably, the first stage 34A, 36A of the receiver means of a slave module 22, 24 is responsive to signals at frequencies lying in a first frequency band, and the second stage 34B, 36B of the receiver means is responsive to signals at frequencies lying in a second frequency band that is broader than the first frequency band. For example, the first frequency band may extend from 1.9 megahertz (MHz) to 2.1 MHz, while the second frequency band extends from 1 MHz to 3 MHz. It should be observed that the first and second frequency bands are both centered on the same frequency of 2 MHz and that the second frequency band contains the first frequency band.

In a variant, the second frequency band is disjoint from the first frequency band. For example, the first frequency band extends from 1.9 MHz to 2.1 MHz, while the second frequency band extends from 100 kHz to 120 kHz. It should be observed that the frequencies of the second frequency band are lower than the frequencies of the first frequency band and that the second frequency band is narrower than the first frequency band.

In the example shown, the first stage 34A, 36A of the receiver means 34, 36 of a slave module 22, 24 includes means forming a narrow bandpass filter and the second stage 34B, 36B of said receiver means includes means forming a broad bandpass filter located functionally upstream from the means forming a narrow bandpass filter.

There follows a description of a method of managing the operation of the slave modules 22, 24 enabling each slave module to be put selectively into a sleep state or into an operational state, by deactivating or activating the first stage 34A, 36A of the receiver means 34, 36 of each slave module 22, 24.

1) Putting Slave Modules into the Sleep State

The first receiver means serve in particular for receiving management signals.

With the slave modules 22, 24 being initially in an operational state, the means 26 of the master module 20 transmit a management signal over the circuit 18, which management signal requests the slave modules 22, 24 to switch to the sleep state.

When the first stage 34A, 36A of a slave module 22, 24 receives the go-to-sleep signal, the module is authorized to transmit only in response to management signals coming from the master module 20.

Thereafter, the master module 20 transmits a management signal to the slave module 22, 24 requesting an acknowledgment from each module 22, 24 that it has properly received the go-to-sleep signal.

Each slave module 22, 24 responds to the master module 20 using its own transmitter means 28, 30 to acknowledge that it has properly received the go-to-sleep signal.

If one of the slave modules 22, 24 does not acknowledge proper reception of the go-to-sleep signal, the master module 20 retransmits a management signal requesting the slave modules 22 and 24 to go to sleep, and the above steps are performed again.

When the master module 20 has received acknowledgments from all of the slave modules 22, 24, it ceases transmitting management signals over the circuit 18.

The slave modules 22, 24 are put into a sleep state after a predetermined time lapse starting from when management signals cease to be received by each of the modules 22, 24 (and which thus terminates after each of the modules 22, 24 has ceased receiving management signals).

Thus, each slave module 22, 24 is in a sleep state after the module has ceased to receive management signals, and consequently after the slave module 22, 24 has acknowledged proper reception of the go-to-sleep signal.

It should be observed that in general the management signals are formed by modulating a carrier wave, with the end of transmission of management signals by the master module then being detected by the slave modules 22, 24 by the modulated or unmodulated carrier wave ceasing to travel over the circuit 18.

It should also be observed that having the slave modules 22, 24 go to sleep only after these modules 22, 24 have ceased to receive management signals, avoids any risk of a slave module 22, 24 that has just gone to sleep returning in untimely manner to the operational state due to wrong interpretation of a management signal relating to another slave module 22, 24.

In a variant of the above method, with the slave modules 22, 24 initially in an operational state, the master module 20 transmits a series of (at least two) identical management signals, each requesting the slave modules 22, 24 to go to sleep. This series of identical management signals thus corresponds to a go-to-sleep instruction for the slave modules 22, 24, which instruction is repeated a certain number of times.

As before, each slave module 22, 24 is put into a sleep state after a time lapse following reception of the management signal requesting the slave modules 22, 24 to go to sleep. Nevertheless, in this configuration, the time lapse begins before the management signals cease to be received. For example, the time lapse begins on the first signal in the series being properly received by the first receiver stage 34A, 36A.

In this variant, there is no need to manage acknowledgment in order to verify that each slave module 22, 24 has properly received a go-to-sleep signal. Repeating the go-to-sleep signal to the slave modules 22, 24 ought, a priori, to guarantee that this instruction is properly received by each of the slave modules.

In addition, the time lapse is preferably selected in such a manner as to be longer than the length of time required for transmitting the series of management signals. This avoids the risk of a slave module 22, 24 that has just gone to sleep returning in untimely manner to an operational state by receiving and wrongly interpreting a second signal in the series.

2) Putting the Slave Modules into the Operational State

With the slave modules 22, 24 initially in a sleep state, the means 26 of the master module 20 transmit a management signal (a wakeup signal) over the circuit 18, requesting the slave modules 22, 24 to switch to the operational state.

The form of the wakeup signal can be relatively rudimentary, insofar as it remains adapted to the structure of the second receiver stage 34B, 36B of the slave modules 22, 24.

On the second receiver stage 34B, 36B of a slave module 22, 24 receiving the wakeup signal, the first receiver stage 34A, 36B is activated, preferably by means of information addressed by the second receiver stage 34B, 36B to the microcontroller 40, 42 which is suitable for communicating with the first and second receiver stages 34A, 36A and 34B, 36B.

Once the slave module 22, 24 has received the wakeup signal it switches to an operational state.

Thereafter, observations are made over a predetermined observation time to determine whether the signal received by the slave module 22, 24 is meaningful.

If after this observation time, it is concluded that the signal is not meaningful, then the slave module 22, 24 is automatically returned to a sleep state, without it being necessary for master module to issue an instruction for this purpose.

This automatic return of the slave module 22, 24 into a sleep state serves to mitigate the slave module 22, 24 being put into an operational state in untimely manner, e.g. as the result of receiving an interference signal (e.g. noise on the circuit 18) in the second receiver stage 34b, 36B of the module 22, 24.

Figure 2:
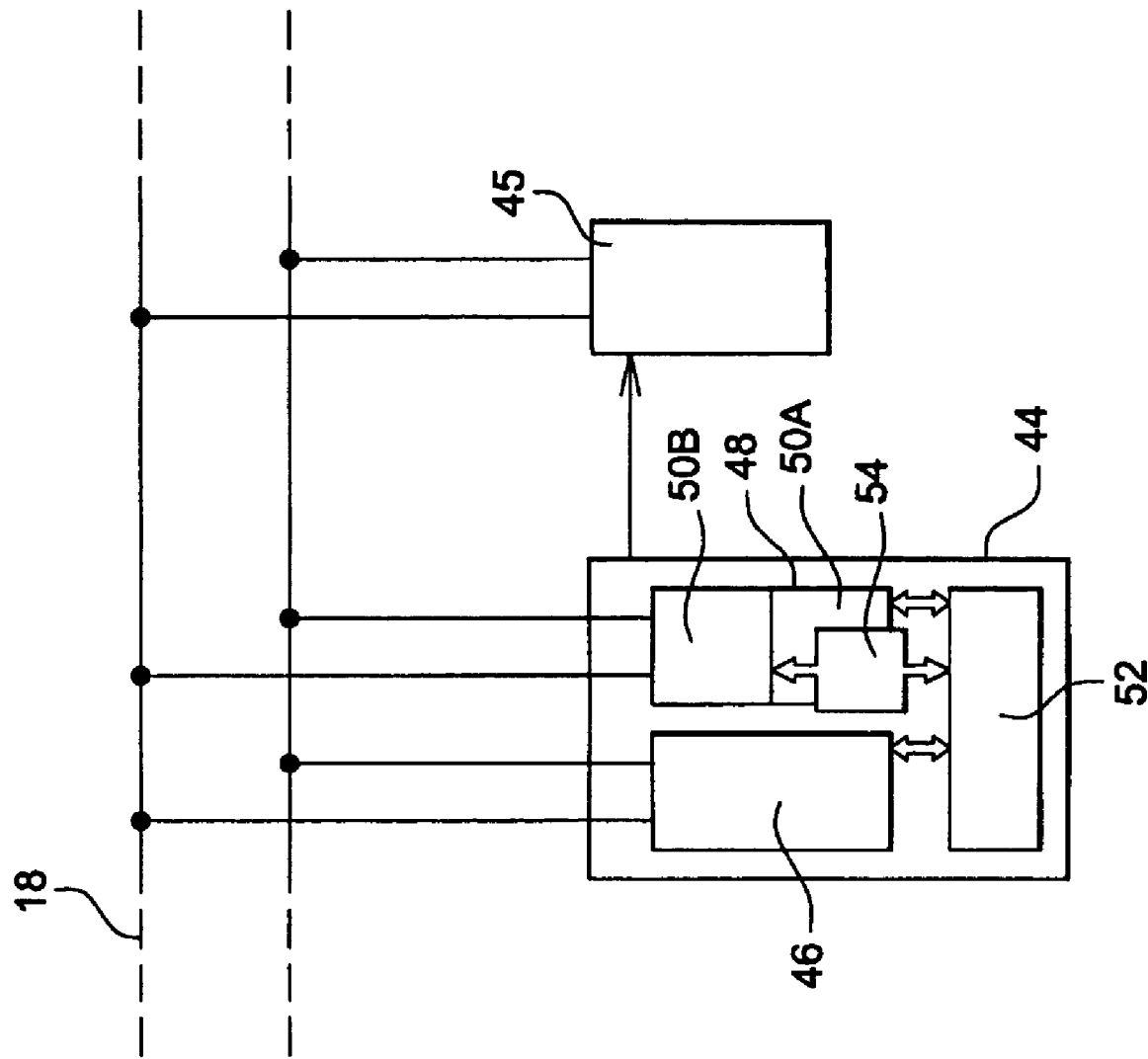
FIG. 2 is a fragmentary diagrammatic view of the network showing a module constituting a second embodiment of the invention.

FIG. 2 shows a slave module 44 in a second embodiment of the invention.

In a manner analogous to the slave modules in the first embodiment, the slave module 44 is intended to exchange information with the master module 20 by means of carrier currents traveling in the electric circuit 18, for the purpose of controlling an electrical member 45 of the motor vehicle.

In a manner analogous with the first embodiment, the slave module 44 comprises transmitter means 46, receiver means 48, themselves comprising two stages 50A and 50B, and a microcontroller 52.

Nevertheless, in this second embodiment, the slave module 44 includes inhibit means 54 for inhibiting signals received by the second receiver stage 50B. These inhibit means 54 comprise, for example, conventional means forming a filter or conventional timer means.

The module 44 is put into the sleep state or into the operational state in a manner analogous to that for the above-described slave modules 22, 24.

Nevertheless, in this second embodiment of the invention, when the slave module 44 is in the sleep state, the inhibit means 54 inhibit signals received by the second receiver stage 50B for a predetermined inhibit time.

In order to put the slave module 44 into an operational state, the master module 20 transmits a wakeup signal over the electric circuit 18 for a duration that is longer than the inhibit time.

After this wakeup signal has been received by the second receiver stage 50B of the slave module 44, the first receiver stage 50A is activated, preferably by information addressed by the second receiver stage 50B to the microcontroller 52 which is capable of communicating with both the first and the second receiver stages 50A and 50B.

Inhibiting the signals received by the second receiver stage 50B makes it possible, a priori, to avoid the slave module 44 being put into the operational state in untimely manner, e.g. as the result of an interfering signal being received by the second receiver stage 50B of the module 44.

Inhibition of the signals received by the second receiver stage 50B also makes it possible to manage the operation of at least two slave modules (of the same type as the slave module 44) in different manner by giving them different inhibit times.

Thus, depending on the duration of the transmitted wakeup signal, a wakeup call can be restricted to a subset of the slave modules in the network, or on the contrary it can be applied to all of the slave modules of the network.

It should be observed that the invention is not limited to the embodiments described.

In particular, other portions of the slave module 22, 24, and 44, such as the transmitter means 26, 28, and 46, and/or the microcontroller 38, 40, and 52 may be deactivated in the sleep state and activated in the operational state.

In addition, the master module 20 may also include first and second receiver means in a manner analogous to the slave modules 22, 24. It can thus itself take on a sleep state or an operational state in the same manner as the slave modules 22, 24.

Finally, the number of slave modules can be arbitrary, and in particular can be greater than two.

The invention claimed is:

1. A module for exchanging information by carrier-currents for controlling an electrical member, the module being of the type comprising:
   first receiver means for receiving an information-conveying signal, said first receiver means being capable of taking two states, respectively an activated state and a deactivated state;
   second receiver means for receiving a wakeup signal for activating the first receiver means to cause them to pass from their deactivated state to their activated state; and
   inhibit means for inhibiting signals received by the second receiver means, the inhibit means comprising means forming a filter or timer means.

2. The module according to claim 1, in which the first receiver means are responsive to signals at frequencies lying in a first frequency band, and the second receiver means are responsive to signals at frequencies lying in a second frequency band that is broader than the first frequency band.

3. The module according to claim 1, in which the first receiver means are responsive to signals at frequencies lying in a first frequency band, and the second receiver means are responsive to signals lying in a second frequency band that is disjoint from the first frequency band.

4. The module according to claim 1, in which the first receiver means include means forming a narrow bandpass filter and the second receiver means include means forming a broad bandpass filter functionally arranged upstream from the means forming a narrow bandpass filter in the propagation direction of a signal received by the module.

5. The module according to claim 1, in which the carrier currents travel in an electric circuit connecting an electric power supply battery to an electrical member of a motor vehicle.

6. A method of managing the operation of a module according to claim 1, wherein the module is selectively put into a sleep state or into an operational state by respectively deactivating or activating the first receiver means, the second receiver means being active in both the sleep state and in the operational state.

7. The method according to claim 6, in which for the first receiver means being designed to receive management signals and the module being initially in an operational state, the module is switched to a sleep state after a predetermined time lapse following reception of a management signal requesting the module to go to sleep, wherein the sleep state is defined as a condition in which the first receiver means is deactivated and the second receiver means is active.

8. The method according to claim 7, in which the time lapse terminates after the management signals have ceased to be received.

9. The method according to claim 8, in which the management signals are formed using a modulated carrier wave, management signals ceasing to be received corresponding to the carrier wave ceasing to be received.

10. The method according to claim 8, in which the time lapse begins after the management signals cease to be received.

11. The method according to claim 8, in which:
on receiving the management signal requesting the module to go to sleep, the module is authorized to transmit only in response to management signals; and
the management signals cease to be received after the module has acknowledged proper reception of the management signal requesting it to go to sleep, in response to a management signal requesting an acknowledgment.

12. The method according to claim 8, in which the time lapse begins before the management signals cease to be received.

13. The method according to claim 6, in which :
for the module being initially in a sleep state, when the second receiver means receive a wakeup signal, the first receiver means are activated in order to put the module in an operational state;
the signal received by the module is observed over a predetermined observation time to determine whether it is meaningful; and
the module is returned to a sleep state if, at the end of the observation time, it is concluded that the signal received by the module is not meaningful.

14. The method according to claim 6, for managing the operation of a module, in which method, when the module is in a sleep state, signals received by the second receiver means are inhibited for a predetermined inhibit time, wherein the module is selectively put into a sleep state or into an operational state by respectively deactivating or activating the first receiver means, the second receiver means being active in both the sleep state and in the operational state, wherein the sleep state is defined as a condition in which the first receiver means is deactivated and the second receiver means is active.

15. The method according to claim 14, in which, for the module initially being in a sleep state, on the second receiver means receiving a wakeup signal of duration longer than the inhibit time, the first receiver means are activated in order to put the module in an operational state.

16. A method of managing the operation of at least two modules, the operation of each module being managed by a method according to claim 14, wherein each module type comprises:
inhibit means for inhibiting signals received by the second receiver means, the inhibit means comprising means forming a filter or timer means; and the inhibit times of the modules are different.

* * * * *